(12) United States Patent
Collodi

(10) Patent No.: US 7,071,937 B1  
(45) Date of Patent: Jul. 4, 2006

(54) DIRT MAP METHOD AND APPARATUS FOR GRAPHIC DISPLAY SYSTEM

(75) Inventor: David J. Collodi, Taylorville, IL (US)

(73) Assignee: CCVG, Inc., Taylorville, IL (US)

( * ) Notice: Subject to any disclaimer, the term of this patent is extended or adjusted under 35 U.S.C. 154(b) by 930 days.

(21) Appl. No.: 09/584,025

(22) Filed: May 30, 2000

(51) Int. Cl.
*G06T 17/00* (2006.01)

(52) U.S. Cl. ..................... 345/426; 345/582
(58) Field of Classification Search ............... 345/172, 345/184, 424, 426, 589, 583, 582; 356/237.2, 356/369
See application file for complete search history.

(56) References Cited

U.S. PATENT DOCUMENTS

| | | | |
|---|---|---|---|
| 4,855,934 A * | 8/1989 | Robinson .................. 345/582 |
| 5,253,339 A * | 10/1993 | Wells et al. ................ 345/426 |
| 5,561,746 A | 10/1996 | Murata et al. |
| 5,638,499 A | 6/1997 | O'Connor et al. |
| 5,659,671 A | 8/1997 | Tannenbaum et al. |
| 5,673,374 A | 9/1997 | Sakaibara et al. |
| 5,808,619 A | 9/1998 | Choi et al. |
| 5,835,220 A * | 11/1998 | Kazama et al. ............ 356/369 |
| 5,936,613 A * | 8/1999 | Jaeger et al. ............... 345/172 |
| 6,175,367 B1 * | 1/2001 | Parikh et al. .............. 345/426 |
| 6,226,005 B1 * | 5/2001 | Laferriere .................. 345/426 |
| 6,226,006 B1 | 5/2001 | Collodi |
| 6,234,901 B1 | 5/2001 | Nagoshi et al. |
| 6,251,011 B1 | 6/2001 | Yamazaki |
| 6,290,604 B1 | 9/2001 | Miyamoto et al. |
| 6,342,885 B1 * | 1/2002 | Knittel et al. ............. 345/424 |
| 6,515,674 B1 * | 2/2003 | Gelb et al. ................ 345/582 |
| 6,654,013 B1 * | 11/2003 | Malzbender et al. ....... 345/426 |

OTHER PUBLICATIONS

Moller et al., "Real–Time Rendering," 1999, A K Peters, Ltd., chapters 4 and 5.*

Moller et al.; Real Time Rendering, A. K. Peters, Ltd., 1999.

Foley et al.; "Computer Graphics: Principles and Practice" pp. 736–744, 866–869, 1996.

PCT Search Report; Form PCT/1SA/220, mailed Jul. 28, 1999, pp. 1–4.

(Continued)

*Primary Examiner*—Mark Zimmerman  
*Assistant Examiner*—Lance W. Sealey  
(74) *Attorney, Agent, or Firm*—Brinks Hofer Gilson & Lione (57) ABSTRACT

A method and system for map based per-pixel specularity modulation of a surface in a real time 3D graphics renderer through the use of interpolated specularity function or environmental map values. One or more functional modules calculate a pair of specular light intensity values or color values. Each specularity value is representative of the specular light reflected by the given pixel at an extreme surface reflectance characteristic, i.e. one may represent reflection from a very smooth surface while the other represents reflection from a very rough surface. A specularity modulation, or dirt map, value is arrived at by either a procedural calculation based on surface offset coordinates or by retrieval from a two-dimensional map contained in a texture memory. The specularity modulation value is then used as a weight to interpolate the pair of specularity values. The resulting interpolated specularity value is then optionally scaled by the modulation value (or a derivative thereof) to produce a final specularity value. This final specularity intensity or color value is then passed to a lighting unit that modulates pixel color appropriately to include the given specular light.

79 Claims, 3 Drawing Sheets

OTHER PUBLICATIONS

Printout of Evans & Sutherland E&S Harmony Image home page at website http://www.es.com/image-generators/harmony.html, Apr. 6, 1999, 6 pages.

Otmphong.doc, Mortensen, Zach; Mar. 30, 1995, reprinted from Internet.

Fast Phong Shading, Bishop and Weimer, 1986, pp. 103–105, reprinted from Internet.

"Reflectance and Textures of Real-World Surfaces," Dana et al., *AMC Transactions on Graphics,* vol. 18, No. 1, Jan. 1999, pp. 1–34.

"Measuring and Modeling Anisotropic Reflection," Gregory J. Ward, *Computer Graphics,* 26, 2, Jul. 1992.

"Predicting Reflectance Functions from Complex Surfaces," Westin et al, *Computer Graphics,* 26, 2, Jul. 1992.

"Diffraction Shaders," Jos Stam, Alias|wavefront, SIGGRAPH 1999.

"Smooth Transitions between Bump Rendering Algorithms," Becker et al. undated.

* cited by examiner

DIRT MAP METHOD AND APPARATUS FOR GRAPHIC DISPLAY SYSTEM

BACKGROUND OF THE INVENTION

The present invention relates generally to the creation of computer generated images for viewing on a display screen. In particular, the present invention relates to the shading of 2-dimensional and 3-dimensional computer generated images.

A primary motivation in the areas of shading and lighting in 3-dimensional computer graphics is to provide the viewer with a more realistic experience by accurately depicting the effects of light on surface variations. Lighting and shading in commercially available 3-dimensional graphics accelerators has traditionally been limited to a relatively simple vertex light variation scheme wherein light calculations are made for each polygon vertex and the resulting color values are interpolated throughout the drawn polygon surface. The limitations of Gouraud interpolation techniques such as these are well known and include inaccurate highlights and representation of only uniform surface variations at polygon vertices. See Gouraud, H., "Computer Display of Curved Surfaces," IEEE Trans. Computers C-20 6:623–629 (1971). The primary motivation for using simplistic shading routines such as Gouraud interpolation is the cost of implementing lighting calculations.

In traditional graphics acceleration hardware, calculations are divided into per-vertex and per-pixel computations. General-purpose floating-point processors usually perform per-vertex computations while per-pixel computations are handled by dedicated fixed-point hardware. Since the throughput rate of per-pixel operations is of chief concern, it has been prohibitive to include complex operations per-pixel as they would either be detrimental to pixel throughput rate or require a substantial gate count to effectively parallelize the operations. Therefore, detailed per-pixel lighting algorithms must be leveraged with execution speed.

With the rapidly increasing transistor capacity of today's microprocessor as well as the advent of lower-cost per pixel lighting strategies such as those disclosed in U.S. patent application Ser. No. 09/222,036, entitled "Method and Apparatus for Providing Shading in a Graphic Display System" and filed in the name of David J. Collodi on Dec. 29, 1998, the entire disclosure of which is hereby incorporated by reference, per pixel computation can be realistically expanded to include more complex lighting operations such as bump-mapping and specularity modulation (dirt mapping).

The goal of most per-pixel lighting strategies is to generate the illusion of surfaces which are more complex than their defining geometry. Real world surfaces are imperfect, containing minor variations in height and composition. Therefore, to generate surfaces that simulate the real world, such surfaces must also contain minor variations in height and composition. Simulation of these variations is most aptly carried out on a per pixel basis. Bump mapping techniques simulate variations in surface orientation through map based per-pixel perturbation of surface normals. Such a technique is disclosed in the above-identified patent application.

Dirt mapping techniques are applied per-pixel to simulate variations of surface reflectivity. A dirt map ordinarily consists of a two-dimensional array of texels, each containing an n-bit number (usually 8 or less) representing a scalar reflectivity value between pre-defined extremes. For example, an 8-bit number can represent a reflectivity between 0 and 255 where 0 is defined as "extremely dull" and 255 is defined to be "highly reflective". The dirt map value can be used to modulate the intensity of specular light at the pixel. The simplest method of achieving this is to multiply the specular intensity by the reflectivity value (taken as a 0–1 scalar). This approach is limited, however, in that the variation of reflective properties is not taken into account. Dull surfaces not only reflect less (specular) light than shiny surfaces; they also reflect it in a different pattern. The shape of the specular highlights produced by dull surfaces is not the same as those produced by glossy surfaces. In order to more accurately simulate the effects of light on variably reflective surfaces, the reflectivity value must also be able to modulate the specularity function as well as the light intensity, whereas a specularity function can be defined as any mathematical relating the intensity of reflected light to the particular angles of view, incidence, surface normal, and or reflection.

Although crude dirt mapping effects can be simulated with multi-pass rendering in today's realtime graphics accelerators, no commercial graphics accelerator provides dedicated logic to allow for the realistic variation of reflective properties per-pixel. Since most real world surfaces have variable reflectivity, the ability to accurately depict this characteristic of real surfaces in dynamic computer generated images would aid in the production of higher quality, more realistic images. Since there exists a significant market demand for realistic computer generated images, there also exists a demand for a realtime 3D graphics product capable of efficiently generating surfaces with variable reflectivity. Furthermore, there exists a demand for a low cost method of implementing said variable reflectivity, i.e., by allowing for a per-pixel variation of surface reflection characteristics and modulating the specular light per-pixel. The present invention details a method and system for the low cost generation of variably reflective surfaces for the purposes of realtime image generation.

SUMMARY OF THE INVENTION

The present invention provides an improved realism for a 3D computer generated image by providing a method and system for the efficient calculation of per-pixel specular light or component values by using a reflectivity modulation value to interpolate between two different specularity functions. A method and system for map based per-pixel specularity modulation of a surface in a real time 3D graphics renderer through the use of interpolated specularity function or environmental map values is provided. One or more functional modules calculate a pair of specular light intensity values or color values. Each specularity value is representative of the specular light reflected by the given pixel at an extreme surface reflectance characteristic, i.e. one may represent reflection from a very smooth surface while the other represents reflection from a very rough surface.

In one preferred embodiment, a specularity modulation, or dirt map, value is arrived at by a procedural calculation based on surface offset coordinates. In another preferred embodiment a specularity modulation value is arrived at by retrieval from a two-dimensional map contained in a texture memory.

The specularity modulation value is then used as a weight to interpolate the pair of specularity values. In another preferred embodiment, the resulting interpolated specularity value is then scaled by the modulation value (or a derivative thereof) to produce a final specularity value. This final specularity intensity or color value is then passed to a lighting unit that modulates pixel color appropriately to include the given specular light.

As used herein, the term "real-time" involves rendering the whole or a significant part of the display image within 1/5 of a second or at the rate of five frames per second or higher. Preferably, a "real-time" image is generated at a rate of 24 or more frames per second. A "real-time" image generator should generate images fast enough to give the illusion of movement.

DETAILED DESCRIPTION OF THE PREFERRED EMBODIMENTS

The methods and systems of the present invention as described below are assumed to operate within the framework of, and further assume the presence of, a computer polygon graphics system which rasterizes polygon surfaces to video RAM. The present invention operates on a per-pixel basis during the drawing of a polygon surface. The framework of a polygon rendering system is used primarily for purposes of illustration because of its widespread use in the industry. It will be apparent to those skilled in the art that the methods and practices of the present invention can be adapted to other per-pixel surface renderers including, but not limited to, NURBS/Belzier surface renderers and voxel surface renders.

Figure 1:
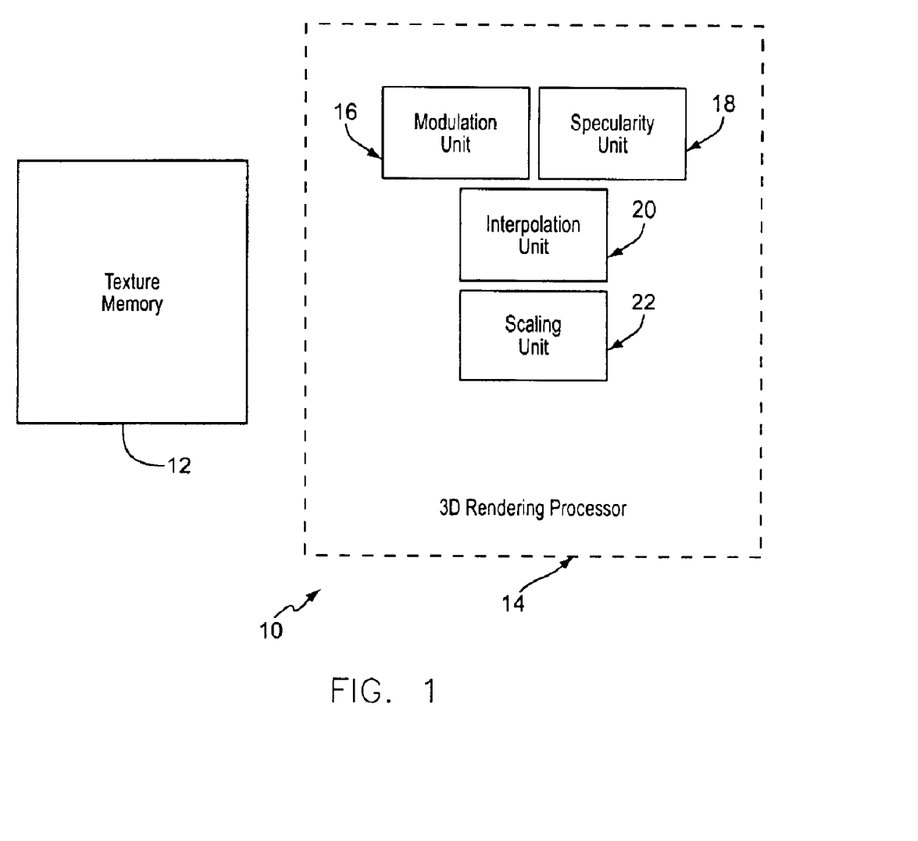
FIG. 1 is a diagram illustrating a realtime 3D graphics system in accordance with a preferred embodiment of the invention.

FIG. 1. gives an overview of a preferred hardware embodiment of a realtime 3D graphics system 10 in accordance with a preferred embodiment of the invention. The system includes: a texture memory 12 that contains one or more dirt maps; a modulation unit 16 which obtains a specularity modulation value, a specularity unit 18 which produces two specularity values; an interpolation unit 20 which uses the modulation value to interpolate the specularity values, and a scaling unit 22 which scales the interpolated specularity value.

Initially, the polygon surface being drawn must be assigned a defined range of reflectivity as provided for in the specularity unit 18. A sufficient description of two or more surface reflectivity functions (representing minimum, maximum, and optionally intermediate reflectivities) must be provided prior to drawing to surface. Numerous methods exist for mathematically describing surface reflectance properties. A simple method employed in the Phong reflection model is to specify the specular exponent value [Phong] 30. The specular coefficient value is determined by $$(N*H)^{exp} \quad (1)$$

Where N is the surface normal vector and H is the halfway vector between a light source vector (L) and a view vector (V). An alternate specularity calculation is give by $$(R*V)^{exp} \quad (2)$$

where R is the reflection of the light source vector around the normal and V is the view vector. In either equation, the exp raises the base result (N*H or R*V) to the specified power and is the sole determinant of surface reflectivity. In general, a higher exp value generates a more reflective surface because it produces bright, sharply defined specular highlights.

As an example with the Phong-type reflection model given above, the minimum surface reflectivity could be given as an exp value of 1, whereas a maximum reflectivity could be assigned an exp value of 8. It is therefore assumed that any point on the surface will fall between this defined range of minimum–maximum specularity. Alternately, more than one range could be defined by providing multiple specularity functions where it is assumed than any surface point will fall into one range, i.e. between two adjacent functions. For example, a Phong surface maximum reflectivity exp value of 8 and a minimum of 1 may also have an intermediate reflectivity exp value of 2. Therefore, any point will either be in the range between the intermediate and the maximum or between the intermediate and the minimum.

Next, for each drawn pixel, a reflectivity modulation value must be arrived at. In one embodiment of the present invention, the modulation value is obtained from a two-dimensional texture map that is mapped onto the polygon surface. The map values are readily stored as n-bit values in either floating-point or fixed-point notation. The map can exclusively contain modulation values or, alternately, can contain modulation values as an added component to other data. For example, a 32-bit rgba texture map could utilize the 8-bit alpha component for each texel as the modulation value. In order to reduce visual aliasing artifacts, the retrieved modulation value can be interpolated from more than one map value, i.e. bi-linearly or tri-linearly interpolated.

In another embodiment of the present invention, the modulation value may be arrived at procedurally by deriving or calculating the modulation value. Procedurally generated "maps" avoid the storage requirements imposed by traditional texture mapping in favor of a calculation-based approach to map value retrieval. For each pixel to be mapped, the u,v surface coordinates (as well as other optional values) are used as inputs to one or more procedural calculation functions which generate potentially unique (texture/bump/dirt) map values for each pixel. This method of texturing requires significantly more calculation per-pixel, but can lead to an enormous reduction of texture memory usage.

In a further embodiment, a unique modulation value is given at each of the polygon's vertices. The modulation values at the vertices are then interpolated throughout the rasterized polygon surface to provide a (potentially) unique modulation value for each drawn pixel.

Once the modulation value is obtained for the pixel, it is then used to interpolate the results of the nearest two specularity functions. The modulation value is interpreted as a 0–1 scalar value. In the example of a fixed-point 8-bit modulation value, the maximum value (255) is interpreted as a 1 and the minimum value (0) is 0. For calculation purposes, it may be more convenient to add 1 to the 8-bit value, producing a value in the range of 1/256 to 1.

In one embodiment of the preset invention, a single min/max reflectivity range is assigned to the surface in the form of a minimum specularity function, $F_{min}$, and a maximum specularity function, $F_{max}$. Each specularity function takes, as inputs, such surface and light source values needed to calculate the specularity including, but not limited to, H and N vectors, R and V vectors, and H*R or R*V scalar values. $F_{min}$ and $F_{max}$ specularity values are calculated for the current pixel. The specularity function may be implemented by hardware. An alternative embodiment may take the form of a look-up table stored in a ROM, for example. The above mentioned modulation value, m, taken as a value in the range of 0–1, is then used to interpolate the two specularity values, where the composite specularity coefficient, $S_f$ is determined by:

$$S_c = F_{max} * m + F_{min} * (1-m) \quad (3)$$

or alternately $$S_c = F_{max} * (1-m) + F_{min} * m \quad (4)$$

Since both specularity functions in a range must be evaluated per-pixel, a preferred practice of the present invention is to implement one or more of the specularity functions as a lookup table. In this scheme, only one function must be evaluated (most likely a base calculation of N*H or R*V) and the value of the other function(s) is obtained from a lookup table. In another embodiment, the specularity functions are chosen so that one can be readily derived from the other. For example, $F_{min}$ is chosen to be (N*H) and $F_{max}$ is chosen to be $(N*H)^2$. $F_{min}$ is first calculated from (N*H), and the result is then squared to produce $F_{max}$. In this example, both extremes ($F_{min}$ and $F_{max}$) are easily calculated whereas values in between (such as $(N*H)^{1.7}$) would be more difficult to generate. It is therefore an advantage of the present invention that the m value is used to interpolate two specularity functions rather then evaluate all possible "in-between" functions.

In other embodiments, the m value can be used to interpolate $F_{max}$ and $F_{min}$ in any defined interpolation method including, but not limited to, linear, quadratic, and cubic interpolation. In a further embodiment, $F_{min}$ and $F_{max}$ are chosen as a "nearest-two" pair of functions from a number of different specularity functions provided for the surface. The m value can be used to determine the particular range of specularity functions as well as a weight to interpolate between the nearest two. Say, for example, three specularity functions are given for the surface: $F_1$, $F_2$, and $F_3$ each representing the minimum, intermediate, and maximum specularity functions respectively, and the modulation value, m, is given as an 8-bit integer value. The high order bit of the m value can be used to determine the applicable specularity range. If the high order bit is a 1, the upper range ($F_2$ and $F_3$) is used, whereas if the high order bit is 0, the lower range ($F_1$ and $F_2$) are used. The lower 7-bits of the m value are then taken as a 0–1 scalar value and used to interpolate the chosen range. The proceeding example is used only to illustrate the concept and operation of utilizing multiple specularity functions per surface. It will be apparent to those skilled in the applicable art that the methods presented above can be adapted to surfaces with any number of provided specularity functions. It will also be clear to those skilled in the art that alternate methods of selecting an appropriate pair of specularity functions exist and are included, without explicit mention, within the methods and practices of the present invention as defined by the appended claims.

Once the composite specularity coefficient, $S_c$, is arrived at by the methods detailed above, it may be optionally scaled by a function of m. The motivation for doing this is because the specularity functions may determine only the shape of the specular highlights and not their relative intensity for various surfaces. Two Phong equations with a different exponent ($F_{min}=N*H$, $F_{max}=(N*H)^4$) exemplify this. Both equations output maximum specular intensity (1.0) in the case where N and H are equal. Less reflective surfaces not only reflect light in a different pattern, but also reflect less light, i.e., the specular intensity is reduced. Therefore, it may be necessary to scale the result to simulate the reduced specular output of a rough surface. Since the m value is defined as the ratio of the reflectivity of the current pixel from the minimum and maximum reflectivity, this value, or some function thereof, may be used to scale the $S_c$ value. The simplest way of doing this is by scaling the $S_c$ value by the m value, where:

$$S_c = S_c * m \quad (5)$$

It should be noted that any function of m and $S_c$ could be used to modify $S_c$'s value. Some examples include:

$$S_c = (S_c)^2 * m \quad (6)$$

$$S_c = S_c - m \quad (7)$$

$$S_c = S_c * m^2 - 1 \quad (8)$$

After intensity modification, the resulting $S_c$ is clamped to the range of 0–1 and passed on to a shading unit which scales the specular light color appropriately and modulates pixel color to incorporate the derived specular light.

An alternate embodiment of the present invention interpolates between two specular color values to determine pixel specularity. In this scheme, the m value is obtained in the method described above. The two specularity functions, however, are replaced by two color values, each retrieved from different color maps. The final color is interpolated from the two color values and optionally scaled before being passed to shading hardware which uses said final color to modulate pixel color. This embodiment is particularly useful for map based reflection techniques such as reflection and environment mapping.

In the above-mentioned alternate embodiment, specular light intensity and/or color is retrieved from map values rather than direct computation. One implementation of map-based specularity involves interpolating two-dimensional vectors across the polygon surface. The interpolated vector is used to address a color map at each pixel. The color retrieved from the map (and optionally interpolated) is taken as the specular light color (or as the pixel color if the surface is completely reflective). These interpolated vectors can represent either surface normal or view reflection (reflection of the view vector around the surface normal).

Another method according to the present invention involves interpolating 3-dimensional vectors. At each pixel, the interpolated 3D vector is divided by its largest component, and the divided values of the other two components are used to address a 2D map, i.e., the vector is extended to point to one of six maps on a cube surrounding it.

Regardless of the manner used to obtain them, map based specularity techniques require an x,y pair of map coordinates per pixel. In the present invention, the x,y coordinate pair is used to address at least two maps—one for the high reflection and one for the low reflection. These two maps may be provided, for example, from the scene database and stored in the RAM of the graphics unit. Usually, the low reflection map is just a filtered version of the high map since coarse surfaces tend to scatter reflected light, thereby blurring the reflected image. A widely used method for facilitating multiple levels of detail for 2D maps is to provide one or more "mip-maps" of the original map. The mip-maps are filtered, lower resolution versions of the original map which are scaled so that the original map coordinates can easily address them.

Color values are next retrieved from the high and low reflection maps. The m value is then used to interpolate the color values from the high and low reflection maps. The resulting color, $C_s$, is then optionally scaled by a function of the m vector in the same manner as the $S_c$ value described above, i.e., the intensity of $C_s$ may need to be reduced or increased dependent on the reflectivity of a point on the surface represented by the current pixel. In addition, the color of specular light, not just its intensity, may also be modulated by a function of the m value. This technique could be used to produce special effects such as a dirty metallic surface in which different parts of the surface reflect different wavelengths of light.

Another embodiment selects a range from three or more maps. Values are obtained from the high and low maps in the selected range and the m value is then used to interpolate and optionally scale the map values. Once a final $C_s$ value is arrived at, it is then sent to a shading unit wherein it is used to modulate surface color accordingly. It should be noted that in the above disclosure, the reflection maps were assumed to contain color values. Those skilled in the art will recognize that the methods disclosed above can be applied to maps containing any type of numeric shading values such as specular light intensity or coefficient values.

According to the present invention, a pixel in a graphics rendering system is assigned a modulated specularity value from a map or procedurally derived modularity value m. An m value is obtained for the current pixel and subsequently used to interpolate between two specularity functions, $F_1$ and $F_2$, representing a high and low surface reflectivity. Each specularity function is evaluated and the resultant values are interpolated using the m value as a weight to obtain a composite specularity value, $S_c$. The composite specularity value is then passed to a shading unit where it is used to modulate output pixel color.

Another preferred embodiment of the present invention uses the m value to interpolate between color values obtained from two reflection maps representing high and low specularity. Color values are obtained from each map. Then the m value is used as a weight to interpolate said color values, resulting in a final color value, $C_s$. This resultant color is then passed to a shading unit where it is used to modulate output pixel color.

The present invention is described here within the example environment of a realtime computer graphics rendering system. It will be clear to those skilled in the art that the methods of the present invention disclosed herein may be adapted to any suitable computer graphics rendering environment including dedicated computer graphics hardware (single or multi-chip), such as a graphics card with a graphics unit, video game console devices, virtual reality devices with a graphics unit, and low and high end graphics workstations. It will also be clear to those skilled in the applicable art that the methods of the present invention may be implemented in a number of ways including custom designed graphics hardware, custom logic within existing graphics hardware devices, micro-code in semi-programmable graphics hardware devices, encoded instructions in a software graphics renderer, and encoded instruction in a programmable per-pixel shading device.

Figure 2:
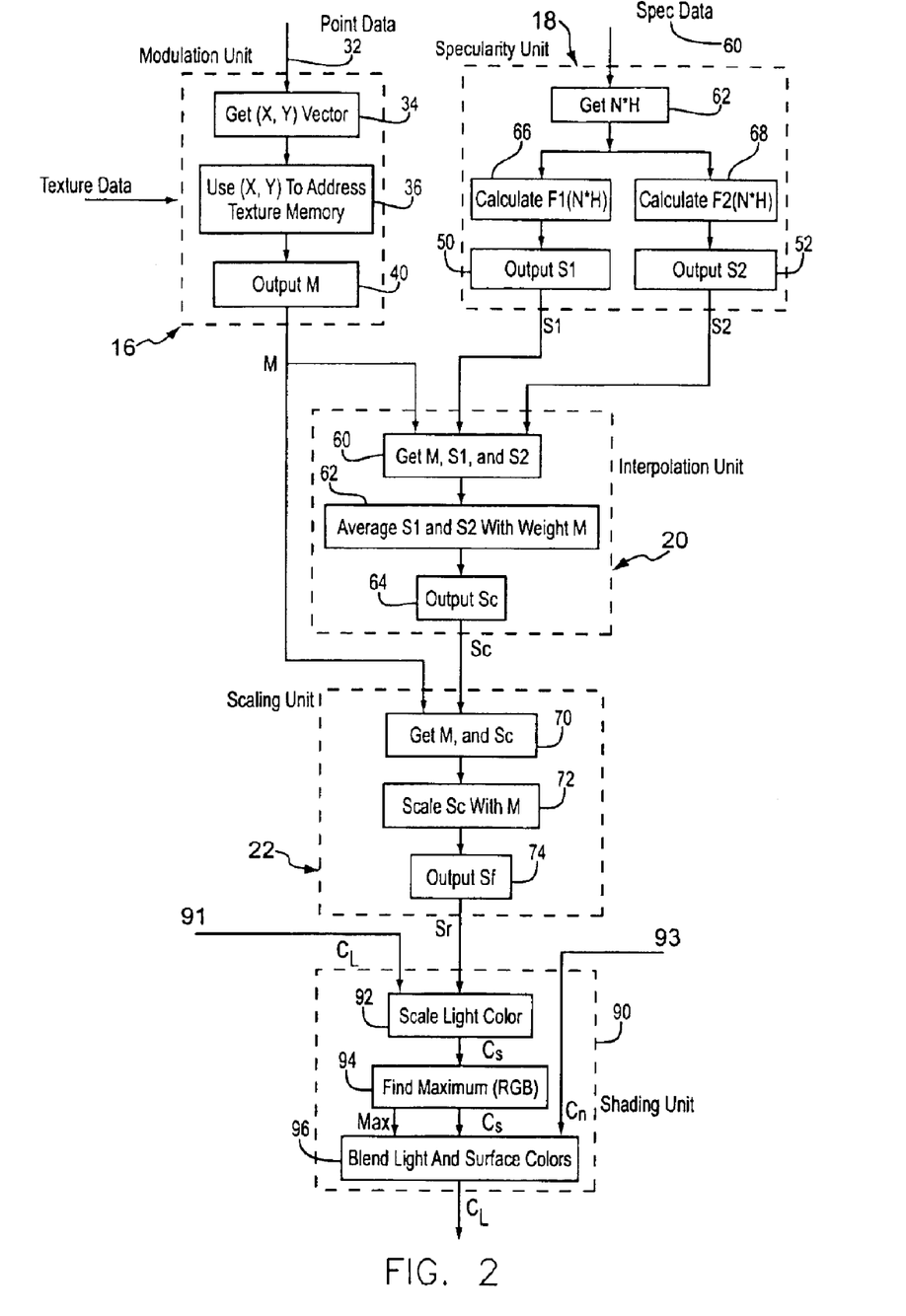
FIG. 2 is a flow chart illustrating the operation of a 3D rendering processor in accordance with a preferred embodiment of the invention.

Referring now to the drawings, FIG. 1. gives an overview of a preferred hardware embodiment 10 of the present invention. The system contains: a modulation unit 16 which obtains a specularity modulation value, a specularity unit 18 which produces two specularity values, an interpolation unit 20 which uses the modulation value to interpolate the specularity values, and a scaling unit 22 which scales the interpolated specularity value. FIG. 2. is a logic diagram demonstrating the operational sequence of the above mentioned modules of FIG. 1.

The operational sequence depicted in FIG. 2 is performed for each drawn pixel of a surface. The first step is for the modulation unit 16 to calculate a modulation value, m. The PointData 32 input to the modulation unit 16 consists of surface values corresponding to the point being drawn. In this example, the PointData contains an (x,y) coordinate vector 34 interpolated from the polygon vertices. The modulation unit 16 uses the coordinate vector to address a 2D map residing in a texture memory 36. The map value corresponding to the coordinate vector is then read in. The map value can be read directly from one map texel or interpolated from a number of texels as in bi-linear and tri-linear interpolation which are well-known techniques to those skilled in the art. The map value, which is assumed to be an n-bit fixed point number taken as a 0–1 scalar value, is output from the modulation unit 16 as the m value 40. It will be obvious to those skilled in the art that the operation of the modulation unit 16 is similar to that of a standard texture unit. The modulation unit 16 can comprise a standard texture unit with the distinction that one or more of the outputs logically constitutes an m value as defined by its subsequent functionality detailed herein.

Next, the specularity unit 18 calculates two specularity values S1, 50, and S2, 52. In this example, the timing of the specularity unit 18 in relation to the modulation unit 16 is not critical. The specularity unit 18 can run prior to or in parallel with the modulation unit 16. It is only necessary that both have executed prior to the next step. The SpecData 60 input to the specularity unit 18 consists of, in this example, a scalar 0–1 value representing (N*H) 62. The N*H value is calculated by an external shading unit such as Phong shading hardware or high speed Phong approximation hardware such as those disclosed in U.S. patent application Ser. No. 09/222,036. The specularity unit 18 then uses the SpecData 60 to calculate the two outputs, S1 and S2. The S1, S2 values are obtained by applying SpecData 60 to two specularity functions, $F_1$, 66 and $F_2$, 68, respectively such that:

$$S1 = F_1(\text{SpecData}) \qquad (9)$$

$$S2 = F_2(\text{SpecData}) \qquad (10)$$

Within the context of this example, the aforementioned specularity functions are performed in the following manner. $F_1$ is implemented as a one-to-one function that simply returns the input. In this case, the $F_1$ function 66 simply passes SpecData 60 to its output S1. The $F_2$ function 68 represents a higher-order function implemented by a lookup table. The SpecData 60 is used to index a linear (1D) lookup table, the result of which is output to S2. Depending on available lookup table size and required accuracy, the result of lookup table can be optionally interpolated. The S1 and S2 output values logically represent the high and low specularity coefficients for the surface at the point of the current pixel. In another embodiment, the $F_1$ and $F_2$ functions 66, 68 are evaluated through direct calculation hardware rather than a lookup table approximation. In a further embodiment, the m value output 40 is taken as an input to the specularity unit 18. The m unit 40 is then used to choose a "nearest-two" pair of specularity functions from a predefined set of functions, $F_1$ through $F_n$.

Once m, S1, and S2 are calculated, they are passed to the interpolation unit 20 at block 60. The interpolation unit 20 at block 62 uses the m value 40 as a weight to interpolate the S1 and S2 values, producing a composite specularity value, $S_c$ 64. The simplest equation for the derivation of $S_c$ is:

$$S_c = S1 * m + S2 * (1-m) \quad (11)$$

where S1, S2, and m are interpreted as 0–1 scalar values. The $S_c$ value represents the specularity value of the current pixel in terms of surface reflectance patterns and not necessarily reflection intensity. In this example, the S1 and S2 values were both potentially 0–1 scalar values, both could take a value of 1 representing maximum specularity. If the m value 40 is such that the surface at the current pixel is considered less reflective, it will be necessary to dim (scale down) the $S_c$ value since S1 and S2 assume maximum brightness. Therefore the $S_c$ value is sent to the scaling unit 22 which takes $S_c$ and m as inputs at block 70 and scales Sc with m 72 produces a scaled output value, $S_f$ 74 as a function of its inputs. In the case where a low m value represents low specularity, the operation of the scaling unit can be described by the following simple formula:

$$S_f = S_c * m \quad (12)$$

Alternate embodiments may employ more complex scaling routines than the one described above. Likewise, an alternate embodiment could provide pre-scaled specularity functions in the specularity unit, thereby eliminating the necessity for scaling the $S_c$ value. These prescribed functions may be implemented in the hardware or alternatively the prescribed functions may be stored in a look-up table.

Finally, the scaled and interpolated specularity value, $S_f$, 74 is passed to a shading unit 90 where it is used to modify the color of the drawn pixel. Techniques for modifying pixel color through the application of specular light are well known. For the sake of clarity and scope, an example is presented, 90. First, at 92, the color of the specular light source, $C_L$, (stored as a 3-dimensional (r,g,b) vector) is scaled by the $S_f$ value, producing a 3-dimensional specular color vector, $C_s$. Traditionally, the $C_s$ value is then combined with a surface color value, $C_n$, to produce a final color value, $C_f$. This combination of specular light is routinely performed in the following manner:

$$C_f = C_n + C_s \quad (13)$$

However, the resultant color in this equation might have component values which are >1 (assuming all components are originally 0–1). An improved method for combining a specular light color, $C_s$, with a surface color, $C_n$, is to interpolate the colors based on the specular intensity. First, at 94, a value, max, is obtained wherein max is the maximum component value of $C_s$, i.e., max is equal to the red, green, or blue component—whichever is greatest. Next max, $C_s$ and $C_n$, as defined previously, are passed to 96 where the final color value, $C_f$, is calculated as follows:

$$C_f = C_n * (1-\max) + C_s \quad (14)$$

This scheme allows the brighter color to dominate while keeping component values in a 0–1 range. The resultant $C_f$ value is then passed out from shading module 90.

Figure 3:
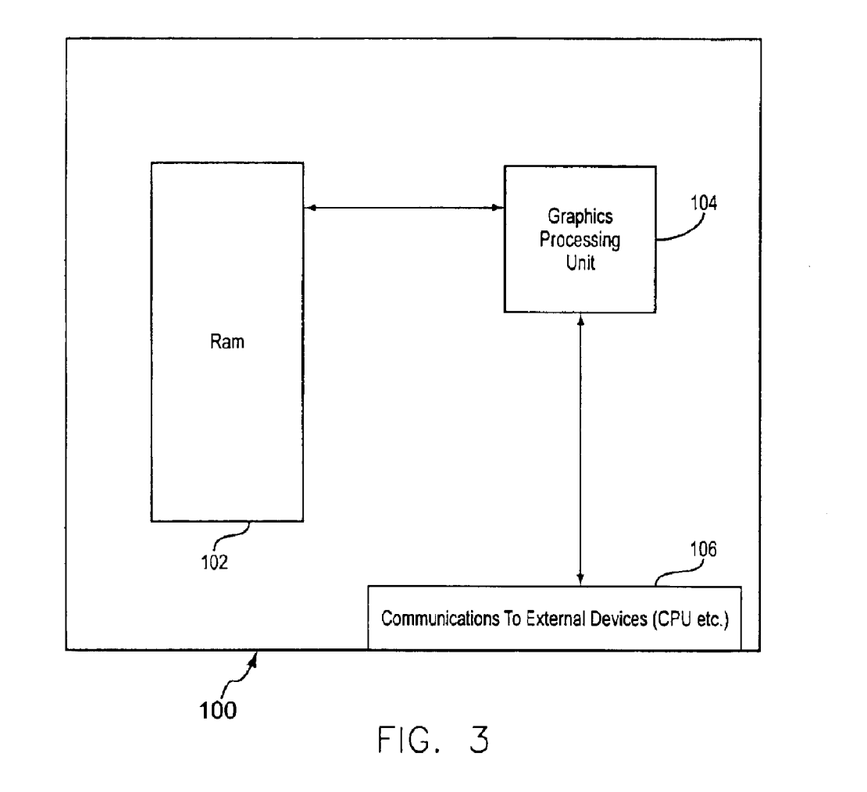
FIG. 3 is a diagram illustrating a 3D graphics card in accordance with a preferred embodiment of the invention.

FIG. 3 illustrates an alternate preferred embodiment of a graphics card 100 implementing the present invention. The graphics card 100 includes RAM 102, a graphics processing unit 104 and communication element 104. The RAM 102 provides temporary storage for texture, bump, and dirt maps as well as any other data relevant to rendering a scene, the graphics processing unit 104 provides logic elements which operate on data to provide pixel information stored in scene memory and the communications element 106 provides a one or two way communications link between the graphics card and an external processor. The graphics card 100 can be implemented with a wide variety of computers such as PC's or low to high-end workstations or in other environments such as stand-alone videogame machines or virtual reality devices.

Now, by methods of the present invention, the current pixel has been shaded according to the intensity of the specular light emanating from the current surface point as well as the reflective properties of the current surface point as defined by the maximum and minimum specularity functions, $F_1$ and $F_2$, and the reflectivity modulation value, m. The calculations performed by the hardware described above are simple enough to implement at a low cost within current and future 3D graphics rendering hardware.

The above description of the present invention in terms of the example environment has been provided for purposes of clarity and convenience only. The disclosure is not intended to limit the scope of the present invention to the implementation of the example environment, but rather as a convenient means to illustrate the methods and practices embodied by the present invention. In fact, upon reading the above description, it should become clear to those skilled in the relevant art how to implement the present invention in alternative environments.

I claim:

1. A method of creating a computer generated image having at least one polygon surface represented by a plurality of pixels comprising:
    providing at least a pair of specular light intensity functions, wherein each specular light intensity function is representative of the specular light reflected by a respective pixel at a different surface reflectance characteristic;
    determining a specularity modulation value for a respective pixel by retrieving the specularity modulation value from a map in a memory;
    interpolating the specular light intensity functions using the specularity modulation value to obtain a composite specularity value; and
    using said composite specularity value to modulate pixel color of the polygon surface of the computer generated image.

2. The method of claim 1 wherein the step of providing at least a pair of specular light intensity functions comprises providing a maximum specular light intensity function and a minimum specular light intensity function.

3. The method of claim 1 further comprising the step of scaling said interpolated specularity value.

4. The method of claim 3 wherein the step of scaling said interpolated specularity value comprises scaling by the modulation value.

5. The method of claim 3 wherein the step of scaling said interpolated specularity value comprises scaling by a derivative of the modulation value.

6. The method of claim 3 wherein said step of providing at least a pair of light intensity functions comprises providing a maximum reflectivity function and a minimum reflectivity function.

7. The method of claim 3 wherein said step of providing at least a pair of light intensity functions comprises providing a maximum reflectivity function, a minimum reflectivity function and at least one intermediate reflectivity function.

8. The method of claim 1 wherein the step of determining the specularity modulation value comprises using at least one procedural calculation function.

9. The method of claim 8 wherein each pixel to be mapped in the display is assigned a pair of surface coordinates and wherein the step of using a procedural calculation comprises using the surface coordinates as inputs to the at least one procedural calculation functions.

10. The method of claim 9 further comprising using the surface coordinates as inputs to a function that generates texture map values for each respective pixel.

11. The method of claim 9 further comprising using the surface coordinates as inputs to a function that generates bump map values for each respective pixel.

12. The method of claim 8 the step of using a procedural calculation comprises using at least one surface value for a respective pixel as an input to the at least one procedural calculation functions.

13. The method of claim 8 the step of using a procedural calculation comprises using at least one light source value for a respective pixel as an input to the at least one procedural calculation functions.

14. The method of claim 1 wherein the step of determining the specularity modulation value comprises a procedural calculation based on surface offset coordinates.

15. The method of claim 1 wherein the step of determining the specularity modulation value comprises retrieving the specularity modulation from a two-dimensional texture map in the memory.

16. The method of claim 1 wherein the step of providing at least a pair of specular light intensity functions comprises specifying a specular exponent value for at least one of the functions.

17. The method of claim 1 wherein the step of determining the specularity modulation value comprises:
    using at least one procedural calculation to determine a first specular light intensity function; and
    obtaining a value of another specular light intensity function from a lookup table.

18. The method of claim 1 wherein the step of determining the specularity modulation value comprises:
    using at least one procedural calculation to determine a first specular light intensity function; and
    deriving the value of another specular light intensity function from the first specular light intensity function.

19. A method of creating a computer generated image having at least one polygon surface represented by a plurality of pixels, the method comprising:
    generating a polygon surface represented by a plurality of vectors for each pixel in said plurality of pixels, the vectors including a light source vector, a surface normal vector and a view vector;
    providing at least a pair of specular light intensity functions, wherein each specular light intensity function is representative of the specular light reflected by a respective pixel at different surface reflectance characteristic;
    determining a specularity modulation value for a respective pixel by retrieving the specularity modulation value from a map in a memory;
    interpolating the specular light intensity functions using the specularity modulation value to obtain a composite specularity value; and
    using said composite specularity value to modulate pixel color of the polygon surface of the computer generated image.

20. The method of claim 19 wherein the polygon comprises a plurality of vertices and further comprising:
    assigning a unique modulation value at each of the polygon's vertices;
    rasterizing the polygon surface; and
    interpolating the modulation values at the vertices throughout the rasterized polygon surface to provide a modulation value for each pixel.

21. The method of claim 19 wherein the step of interpolating comprises:
    interpolating two-dimensional vectors across the polygon surface;
    using the interpolated vector to address a color map for each pixel; and
    retrieving a color from the map and using the color as the specular light color for the respective pixel.

22. The method of claim 19 wherein the step of interpolating comprises:
    interpolating three-dimensional vectors across the polygon surface;
    at each pixel, dividing the interpolated three-dimensional vector by its largest component;
    using the divided values of the other two components to address a two-dimensional color map for each pixel; and
    retrieving a color from the map and using the color as the specular light color for the respective pixel.

23. The method of claim 19 wherein the step of providing at least a pair of specular light intensity functions comprises providing a maximum specular light intensity function and a minimum specular light intensity function.

24. The method of claim 19 further comprising the step of scaling said interpolated specularity value.

25. The method of claim 24 herein the step of scaling said interpolated specularity value comprises scaling by the modulation value.

26. The method of claim 24 wherein the step of scaling said interpolated specularity value comprises scaling by a derivative of the modulation value.

27. The method of claim 24 wherein said step of providing at least a pair of light intensity functions comprises providing a maximum reflectivity function and a minimum reflectivity function.

28. The method of claim 24 wherein said step of providing at least a pair of light intensity functions comprises providing a maximum reflectivity function, a minimum reflectivity function and at least one intermediate reflectivity function.

29. The method of claim 19 wherein the step of determining the specularity modulation value comprises using at least one procedural calculation function.

30. The method of claim 29 wherein each pixel to be mapped in the display is assigned a pair of surface coordinates and wherein the step of using a procedural calculation comprises using the surface coordinates as inputs to the at least one procedural calculation functions.

31. The method of claim 30 further comprising using the surface coordinates as inputs to a function that generates texture map values for each respective pixel.

32. The method of claim 30 further comprising using the surface coordinates as inputs to a function that generates bump map values for each respective pixel.

33. The method of claim 29 the step of using a procedural calculation comprises using at least one surface value for a respective pixel as an input to the at least one procedural calculation functions.

34. The method of claim 29 the step of using a procedural calculation comprises using at least one light source value for a respective pixel as an input to the at least one procedural calculation functions.

35. The method of claim 19 wherein the step of determining the specularity modulation value comprises a procedural calculation based on surface offset coordinates.

36. The method of claim 19 wherein the step of determining the specularity modulation value comprises retrieving the specularity modulation coordinate from a two-dimensional texture map in the memory.

37. The method of claim 19 wherein the step of providing at least a pair of specular light intensity functions comprises specifying a specular exponent value for at least one of the functions.

38. The method of claim 19 wherein the step of determining the specularity modulation value comprises:
   using at least one procedural calculation to determine a first specular light intensity function; and
   obtaining a value of another specular light intensity function from a lookup table.

39. The method of claim 19 wherein the step of determining the specularity modulation value comprises:
   using at least one procedural calculation to determine a first specular light intensity function; and
   deriving the value of another specular light intensity function from the first specular light intensity function.

40. A method of creating a computer generated image having at least one polygon surface represented by a plurality of pixels comprising:
   providing at least a pair of color intensity functions, wherein each color intensity function is representative of the color reflected by a respective pixel at a different surface reflectance characteristic;
   determining a color modulation value for a respective pixel by retrieving the color modulation value from a memory;
   interpolating the color intensity functions using the color modulation value to obtain a composite color value; and
   using said composite color value to modulate pixel color of the polygon surface of the computer generated image.

41. The method of claim 40 wherein the step of providing at least a pair of color intensity functions comprises providing a maximum color intensity function and a minimum color intensity function.

42. The method of claim 40 further comprising the step of scaling said interpolated color value.

43. The method of claim 42 wherein the step of scaling said interpolated color value comprises scaling by the modulation value.

44. The method of claim 42 wherein the step of scaling said interpolated color value comprises scaling by a derivative of the modulation value.

45. The method of claim 42 wherein said step of providing at least a pair of light intensity functions comprises providing a maximum reflectivity function and a minimum reflectivity function.

46. The method of claim 42 wherein said step of providing at least a pair of light intensity functions comprises providing a maximum reflectivity function, a minimum reflectivity function and at least one intermediate reflectivity function.

47. The method of claim 40 wherein the step of determining the color modulation value comprises using at least one procedural calculation function.

48. The method of claim 47 wherein each pixel to be mapped in the display is assigned a pair of surface coordinates and wherein the step of using a procedural calculation comprises using the surface coordinates as inputs to the at least one procedural calculation functions.

49. The method of claim 48 further comprising using the surface coordinates as inputs to a function that generates texture map values for each respective pixel.

50. The method of claim 48 further comprising using the surface coordinates as inputs to a function that generates bump map values for each respective pixel.

51. The method of claim 47 the step of using a procedural calculation comprises using at least one surface value for a respective pixel as an input to the at least one procedural calculation functions.

52. The method of claim 47 the step of using a procedural calculation comprises using at least one light source value for a respective pixel as an input to the at least one procedural calculation functions.

53. The method of claim 40 wherein the step of determining the color modulation value comprises a procedural calculation based on surface offset coordinates.

54. The method of claim 40 wherein the step of determining the color modulation value comprises retrieving the color modulation coordinate from a two-dimensional map contained in a texture memory.

55. The method of claim 40 wherein the step of providing at least a pair of color intensity functions comprises specifying a specular exponent value for at least one of the functions.

56. The method of claim 40 wherein the step of determining the color modulation value comprises:
   using at least one procedural calculation to determine a first color intensity function; and
   obtaining a value of another color intensity function from a lookup table.

57. The method of claim 40 wherein the step of determining the color modulation value comprises:
   using at least one procedural calculation to determine a first color intensity function; and
   deriving the value of another color intensity function from the first color intensity function.

58. A method of creating a computer generated image having at least one polygon surface represented by a plurality of pixels, the method comprising:
   generating a polygon surface represented by a plurality of vectors for each pixel in said plurality of pixels, the vectors including a light source vector, a surface normal vector and a view vector;
   providing at least a pair of color intensity functions, wherein each color intensity function is representative of the specular light reflected by a respective pixel at different surface reflectance characteristic;
   determining a color modulation value for a respective pixel;
   interpolating the color intensity functions using the color modulation value to obtain a composite color value; and
   using said composite color value to modulate pixel color of the polygon surface of the computer generated image.

59. The method of claim 58 wherein the polygon comprises a plurality of vertices and further comprising:
   assigning a unique modulation value at each of the polygon's vertices;
   rasterizing the polygon surface; and
   interpolating the modulation values at the vertices throughout the rasterized polygon surface to provide a modulation value for each pixel.

60. The method of claim 58 wherein the step of interpolating comprises:
   interpolating two-dimensional vectors across the polygon surface;

using the interpolated vector to address a color map for each pixel; and retrieving a color from the map and using the color as the specular light color for the respective pixel.

61. The method of claim 58 wherein the step of interpolating comprises:

interpolating three-dimensional vectors across the polygon surface;

at each pixel, dividing the interpolated three-dimensional vector by its largest component;

using the divided values of the other two components to address a two-dimensional color map for each pixel; and retrieving a color from the map and using the color as the specular light color for the respective pixel.

62. The method of claim 58 wherein the step of providing at least a pair of color intensity functions comprises providing a maximum color intensity function and a minimum color intensity function.

63. The method of claim 58 further comprising the step of scaling said interpolated color value.

64. The method of claim 63 herein the step of scaling said interpolated color value comprises scaling by the modulation value.

65. The method of claim 63 wherein the step of scaling said interpolated color value comprises scaling by a derivative of the modulation value.

66. The method of claim 63 wherein said step of providing at least a pair of light intensity functions comprises providing a maximum reflectivity function and a minimum reflectivity function.

67. The method of claim 63 wherein said step of providing at least a pair of light intensity functions comprises providing a maximum reflectivity function, a minimum reflectivity function and at least one intermediate reflectivity function.

68. The method of claim 58 wherein the step of determining the color modulation value comprises using at least one procedural calculation function.

69. The method of claim 68 wherein each pixel to be mapped in the display is assigned a pair of surface coordinates and wherein the step of using a procedural calculation comprises using the surface coordinates as inputs to the at least one procedural calculation functions.

70. The method of claim 69 further comprising using the surface coordinates as inputs to a function that generates texture map values for each respective pixel.

71. The method of claim 69 further comprising using the surface coordinates as inputs to a function that generates bump map values for each respective pixel.

72. The method of claim 68 the step of using a procedural calculation comprises using at least one surface value for a respective pixel as an input to the at least one procedural calculation functions.

73. The method of claim 58 wherein the step of determining the color modulation value comprises a procedural calculation based on surface offset coordinates.

74. The method of claim 58 wherein the step of determining the color modulation value comprises retrieving the color modulation coordinate from a two-dimensional map contained in a texture memory.

75. The method of claim 58 wherein the step of providing at least a pair of color intensity functions comprises specifying a specular exponent value for at least one of the functions.

76. The method of claim 68 the step of using a procedural calculation comprises using at least one light source value for a respective pixel as an input to the at least one procedural calculation functions.

77. The method of claim 58 wherein the step of determining the color modulation value comprises:

using at least one procedural calculation to determine a first color intensity function; and obtaining a value of another color intensity function from a lookup table.

78. The method of claim 58 wherein the step of determining the color modulation value comprises:

using at least one procedural calculation to determine a first color intensity function; and deriving the value of another color intensity function from the first color intensity function.

79. A method of generating a display comprising a plurality of pixels on a screen comprising:

providing at least a pair of specular light intensity functions, wherein each specular light intensity function is representative of the specular light reflected by a respective pixel at a different surface reflectance characteristic including using at least one procedural calculation to determine a first specular light intensity function, and obtaining a value of another specular light intensity function from a lookup table;

determining a specularity modulation value for a respective pixel;

interpolating the specular light intensity functions using the specularity modulation value to obtain a composite specularity value; and using said composite specularity value to modulate pixel color on said screen.

* * * * *

UNITED STATES PATENT AND TRADEMARK OFFICE
CERTIFICATE OF CORRECTION

PATENT NO. : 7,071,937 B1  Page 1 of 1
APPLICATION NO. : 09/584025
DATED : July 4, 2006
INVENTOR(S) : David J. Collodi It is certified that error appears in the above-identified patent and that said Letters Patent is hereby corrected as shown below:

On the title page, under (*) Notice, delete "930 days" and insert therefor --994 days--.

Signed and Sealed this

Twenty Second Day of April, 2008

JON W. DUDAS
*Director of the United States Patent and Trademark Office*